United States Patent
Hansen et al.

(10) Patent No.: US 10,120,649 B2
(45) Date of Patent: Nov. 6, 2018

(54) PROCESSOR AND METHOD FOR OUTER PRODUCT ACCUMULATE OPERATIONS

(71) Applicant: MicroUnity Systems Engineering, Inc., Los Altos, CA (US)

(72) Inventors: Craig Hansen, Los Altos, CA (US); John Moussouris, San Francisco, CA (US); Alexia Massalin, Sunnyvale, CA (US)

(73) Assignee: MicroUnity Systems Engineering, Inc., Santa Clara, CA (US)

( * ) Notice: Subject to any disclaimer, the term of this patent is extended or adjusted under 35 U.S.C. 154(b) by 164 days.

(21) Appl. No.: 15/224,176

(22) Filed: Jul. 29, 2016

(65) Prior Publication Data

US 2018/0032312 A1    Feb. 1, 2018

(51) Int. Cl.
*G06F 7/523*    (2006.01)
*G06F 7/504*    (2006.01)
*G06F 7/544*    (2006.01)

(52) U.S. Cl.
CPC ............ *G06F 7/523* (2013.01); *G06F 7/5045* (2013.01); *G06F 7/5443* (2013.01); *G06F 2207/3828* (2013.01)

(58) Field of Classification Search
None
See application file for complete search history.

(56) References Cited

U.S. PATENT DOCUMENTS

| | | | |
|---|---|---|---|
| 4,697,247 A | 9/1987 | Grinberg et al. | |
| 5,185,715 A | 2/1993 | Zikan et al. | |
| 5,742,840 A * | 4/1998 | Hansen | G06F 9/30 375/E7.019 |
| 5,953,241 A | 9/1999 | Hansen et al. | |
| 5,983,253 A | 11/1999 | Fischer et al. | |
| 6,571,268 B1 * | 5/2003 | Giacalone | G06F 5/01 708/524 |
| 7,181,484 B2 * | 2/2007 | Stribaek | G06F 7/5443 708/492 |
| 7,395,298 B2 * | 7/2008 | Debes | G06F 7/4812 708/603 |
| 8,307,023 B1 * | 11/2012 | Leung | G06F 7/5324 708/625 |
| 2006/0004902 A1 * | 1/2006 | Simanapalli | G06F 7/4812 708/670 |
| 2008/0104164 A1 | 5/2008 | Kaul et al. | |
| 2012/0011348 A1 | 1/2012 | Eichenberger et al. | |

FOREIGN PATENT DOCUMENTS

EP    3276486    1/2018

OTHER PUBLICATIONS

European Patent Application No. 17183101.9, "Extended European Search Report", dated Jan. 2, 2018, 5 pages.

* cited by examiner

*Primary Examiner* — Michael D. Yaary
(74) *Attorney, Agent, or Firm* — Kilpatrick Townsend & Stockton LLP

(57) ABSTRACT

A processor and method for performing outer product and outer product accumulation operations on vector operands requiring large numbers of multiplies and accumulations is disclosed.

23 Claims, 11 Drawing Sheets

PROCESSOR AND METHOD FOR OUTER PRODUCT ACCUMULATE OPERATIONS

BACKGROUND OF THE INVENTION

This invention relates to computer technology, and to a processor and methods for performing outer product and outer product accumulate operations.

Communications products require increased computational performance to process digital signals in software on a real time basis. Increases in performance in the past twenty years have come through improvements in transistor technology and processor design. Transistor counts have doubled in accordance with Moore's law about every two years, increasing thousand fold from a few million to a few billion transistors per chip. Processor design has improved peak performance per instruction by architectural innovations that enabled effectively doubling datapath width about every four years, increasing from 32 bits (e.g. Intel's Pentium) to 1024 bits (e.g. Qualcomm's Hexagon HVX) over about the past twenty years.

Digital communications typically rely on linear algorithms that multiply and add data with 32 bits of precision or less. In fact, digital video and radio processing typically operate on 16 bit or even 8 bit data. As datapath width has increased far beyond these data widths, substantially peak usage has been maintained by partitioning operands and datapaths using a variety of methods, treated extensively, for example, in our commonly assigned U.S. Pat. Nos. 5,742,840; 5,794,060; 5,794,061; 5,809,321; and 5,822,603.

These patents describe systems and methods for enhancing the utilization of a processor by adding classes of instructions. These classes of instructions use registers as data path sources, partition the operands into symbols of a specified size, perform operations in parallel, catenate the results and place the catenated results into a register. These patents, as well as other commonly assigned patents, describe processors optimized for processing and transmitting data streams using significant parallelism.

In our earlier U.S. Pat. No. 5,953,241, we describe group multiply and sum operations (column 4 therein) which each one of four multiplier operands a, b, c, and d is multiplied by a corresponding one of four multiplicand operands e, f, g, and h to produce products a*e, b*f, c*g, and d*h. See, e.g. FIGS. 1 and 3 therein. We also describe a multiply and add operation in which operands i, j, k, and l are added to the products of the multiplications to produce results a*e+i, b*f+j, c*g+k, and d*h+l. See, e.g. FIGS. 2 and 4. These operations are described for both fixed-point and floating-point operands.

Others have developed a processor in which a vector-by-scalar multiply reduction is performed. See, e.g. The Qualcomm HVX architecture with SIMD extensions. This processor allows a group of four vector operands to be multiplied by one scalar operand with the four results being summed. See, e.g. FIG. 11, taken from http://www.hotchips.org/wp-content/uploads/hc_archives/hc27/HC27.24-Monday-Epub/HC27.24.20-Multimedia-Epub/HC27.24.211-Hexagon680-Codrescu-Qualcomm.pdf.

Emerging applications such as 5G communications, virtual reality, and neural networks, however, create an appetite for digital processing many orders of magnitude faster and more power efficient than these technologies. Moore's law is slowing as gate widths below 10 nm span fewer than 200 silicon lattice spacings. Advances in processor design are becoming more essential to accommodate the power performance needs of these applications.

Existing processor datapaths typically consume a small fraction of total processor power and area, so doubling their width doubles peak performance more efficiently than doubling the number of processor cores. There are practical constraints, however, on the number of doublings of the width of registers. The register complex typically comprises the central traffic interchange of the processor, operating at high clock rates. These registers have many input and output ports tightly coupled through a bypass network to multiple execution units. Wider execution units must avoid bottlenecks and sustain a large fraction of peak performance on targeted applications. These processor designs and methods must be capable of sustaining a large fraction of peak performance for algorithms needed by emerging applications such as 5G communications, virtual reality, and neural networks, yet at the same time be highly efficient in area and power.

Thus, there is a need for processor designs and methods that enable orders of magnitude increases in peak performance without greatly complicating the register complex. In particular many practical applications for such processors, e.g. machine learning and image processing, would benefit from a processor capable of performing an outer product. In an outer product each element of one vector is multiplied by each element of another vector. For example, given vectors U and V:

$$\vec{U} = u_1 e_1 + u_2 e_2 + u_3 e_3 \Rightarrow \begin{bmatrix} u_1 \\ u_2 \\ u_3 \end{bmatrix}$$

$$\vec{V} = v_1 e_1 + v_2 e_2 + v_3 e_3 \Rightarrow \begin{bmatrix} v_1 \\ v_2 \\ v_3 \end{bmatrix}$$

The outer product of vectors U and V is:

$$\vec{U}\vec{V}^T = \begin{bmatrix} u_1 \\ u_2 \\ u_3 \end{bmatrix} \begin{bmatrix} v_1 & v_2 & v_3 \end{bmatrix} = \begin{bmatrix} u_1 v_1 & u_1 v_2 & u_1 v_3 \\ u_2 v_1 & u_2 v_2 & u_2 v_3 \\ u_3 v_1 & u_3 v_2 & u_3 v_3 \end{bmatrix}$$

SUMMARY OF THE INVENTION

Our invention provides a processor and method for calculating outer products and serially accumulating each product. In a preferred embodiment of the method of the invention, the processor has a register file with a bit width of r bits, and an array of multipliers arranged in rows and columns. Each multiplier has an accumulator associated with it within the array. To perform an outer product of a vector multiplier operand and a vector multiplicand operand the processor loads a multiplier operand and a multiplicand operand into each of the multipliers resulting in the multiplier at location [i, j] in the array receiving multiplier operand i and multiplicand operand j. At each multiplier a first multiplication of the multiplier operand i with the multiplicand operand j is performed to produce a first multiplication result which is wider than r bits. The first multiplication result is then provided to the accumulator associated with that multiplier, where it is added to any previous multiplication result stored in the accumulator. The result is a multiplication of every element of the vector multiplier operand with every element of the vector multiplicand operand. When all of the desired multiplications and accumulations are complete, the results are copied out of the array.

In a preferred embodiment the processor of the invention has a register file with a bit width of r bits. Each of the plurality n of multiplier operands has a bit width of b bits, providing an aggregate width of r bits where r=n*b, and each of the plurality n of multiplicand operands has a bit width of b bits, also providing an aggregate width of r bits where r=n*b. An array of multipliers is arranged in rows and columns, with each column coupled to receive one multiplier operand, and each row coupled to receive one multiplicand operand. Each multiplier thus receives a multiplier operand and a multiplicand operand. The multipliers in the processor multiply the operands to provide a plurality $n^2$ of multiplication results having an aggregate bit width greater than r bits. The processor also includes a corresponding array of accumulators arranged in rows and columns, each accumulator being coupled to a corresponding multiplier. The processor uses the accumulators to add sequential multiplications from each multiplier. When the desired operations are complete, the results from each accumulator are shifted out of the array.

The invention also includes implementation circuitry for each multiplier and accumulator "tile" in the array, as well as techniques and circuitry for loading data into and shifting data out of the array.

DETAILED DESCRIPTION

When the size of an execution unit result is constrained, it can limit the amount of computation that reasonably can be performed in response to a single instruction. As a consequence, algorithms are implemented in a series of single instruction steps in which all intermediate results can be represented within the constraints. By eliminating this limitation, however, instruction sets can be developed in which a larger portion of an algorithm is implemented as a single instruction. If at least some of these intermediate results are not required to be retained upon completion of the larger component of an algorithm, a processor will provide improved performance and reduced power consumption by not storing and retrieving intermediate results from the general register file. When the intermediate results are not retained in the general register file, processor instruction sets and implemented algorithms are also not constrained by the size of the general register file.

This invention is particularly related to multiplication and addition operations. For example, in image processing and deep learning applications, large numbers of multiplications and additions are often required. With conventional processors these operations are undesirably slow, restricting the usefulness of the particular applications. The invention described here enables efficiently performing a particular pattern of multiplications and additions known as an outer product accumulation. The result of applying an outer product operation to a multiplier and multiplicand, each a pair of a one-dimensional vectors is a two-dimensional matrix. An outer product has two important properties with respect to the invention described here. First, all possible multiplications between the multiplier and multiplicand operands are performed within an outer product. Second, none of these results are added together. Thus the computation of an outer product can be performed in completely parallel fashion. The outer product results are each serially accumulated to calculate a sum of products. These sums of products form a result, an accumulation of outer products. At this point this final result may be further processed, for example, as by rounding, shifting, truncating or performing unary operations on these results as they are read out of the outer product accumulation array.

Array Structure

Figure 1:
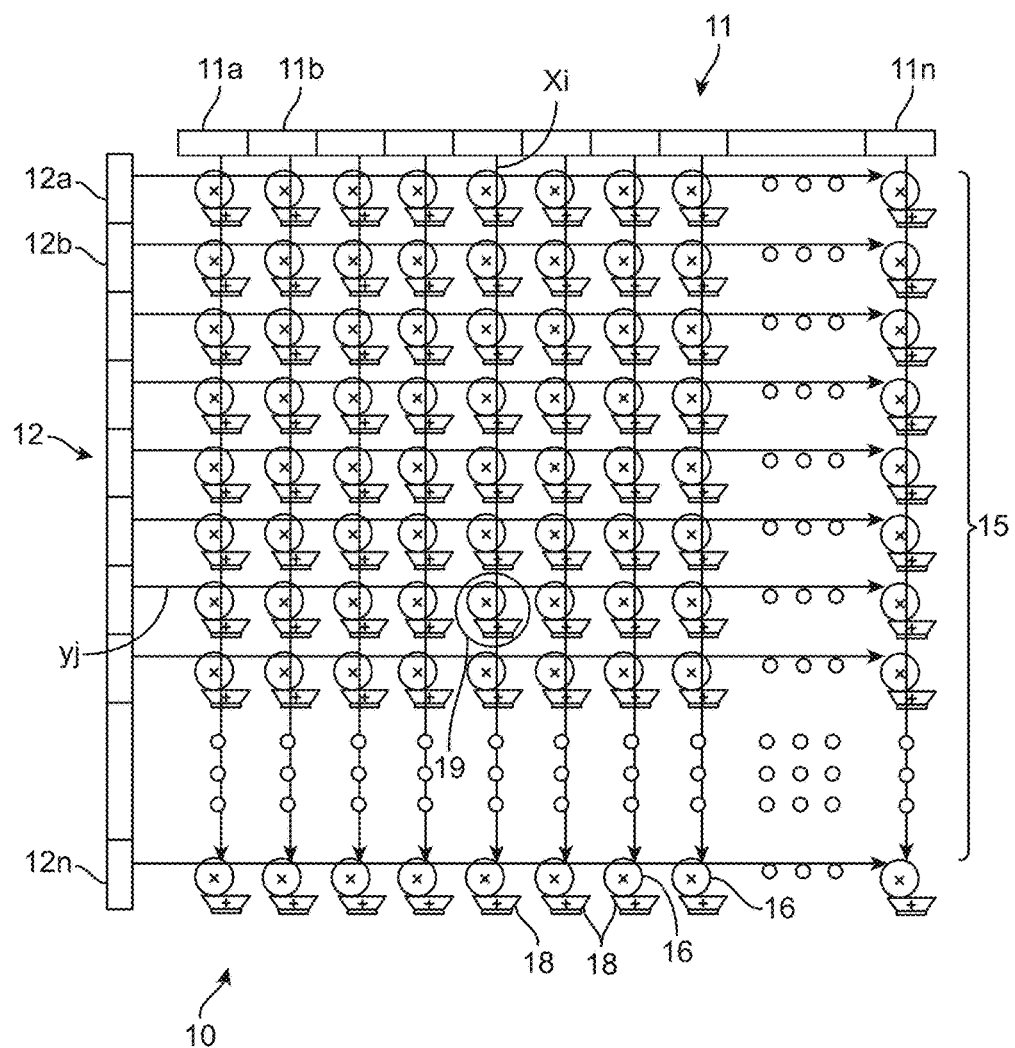
FIG. 1 is a diagram of an array of multipliers with associated accumulators useful for computing outer products.

FIG. 1 illustrates a preferred implementation of our processor for computing an outer product. As shown there, the apparatus 10 includes an arbitrarily large array 15 of multipliers 16. Each multiplier 16 is coupled to receive a multiplier operand and a multiplicand operand from associated registers 11 and 12. These registers have previously been loaded with the vector operands from a cache memory, external system memory or other source. The registers are illustrated as being divided into byte wide (or other width) segments 11a, 11b . . . 11n and 12a, 12b, . . . 12n (where n is an arbitrarily large number). Each multiplier 16 multiplies the received operands and provides a result. For example, the multiplier at location 19 will receive operands x[i] and y[j] and multiply them together. Herein we refer to each tile in the array that includes a multiplier as a "tile." As will be described below there are various embodiments for each tile, with the choice of components depending upon the particular application for the processor.

In a preferred embodiment as also illustrated in FIG. 1, each multiplier 16 has associated with it an accumulator 18. The accumulator 18 stores a running sum of the sequential multiplication results from multiplier 16. Each accumulator 18 will thus ultimately store the sum of the individual multiplications computed by its associated multiplier 16. More generally, multiplier-accumulator 19 will multiply operands x[i] and y[j] together, then add that result to the previous contents in the accumulator. By virtue of the multiplications and running sum, the result stored in the accumulator will be significantly wider than the width of the input operands. This is discussed further below, together with a more detailed description of multiplier-accumulator interface with surrounding circuitry. The detailed circuit design for multipliers and accumulators is well known and not described further herein.

Typically data processing operations will have been carried out on the operands before they are stored in registers 11 and 12. In addition, as specified by the instructions controlling the processor, further operations can be performed on the results of the multiplication-accumulation. Herein we describe the typical circumstance in which the outer product is computed with the same number of multipliers and multiplicands, thus resulting in a square array 15.

Using the techniques described herein, however, other shapes of arrays, e.g. rectangular, can also be implemented.

The size of the result of an outer product is larger than the input operands x[i] and y[j]. When multiplying two binary values of size B bits, in registers 11 and 12, representing either a signed value of range $-2^{(B-1)} \ldots 2^{(B-1)}-1$, or an unsigned value of range $0 \ldots 2^{(B-1)}$, 2B bits are generally required to represent the range of values of the product. In a square array, using N multipliers n[0] ... n[N−1] and N multiplicands y[0] ... y[N−1], produces an outer product with $N^2$ results x[i]*y[j], where i is 0 ... N−1 and j is 0 ... N−1.

If B is 16 bits, and N is 8, the multiplier and multiplicand are each 128 bits (B*N), and the outer product will be 2048 bits ($2B*N^2$). While the multiplier and multiplicand may fit in a register file that supports operands of 128 bits, the outer product is too large to fit in a typical register file. Even if the size of the register file is extended to, for example, 1024 bits, with B=16 bits, N can be 64, then the outer product can perform 4096 ($N^2$) multiplications. This, however, yields 131072 bits of results ($2B*N^2$). To fit this result into a 1024 bit register file would require 128 registers, a number larger than the largest register files normally employed in a general-purpose processor.

The outer product result, however, can be stored in the system memory associated with a processor—as opposed to the registers associated with the processor. With this approach, a single instruction, referred to herein as 'Outer-Product', can specify an operation code for the instruction, together with the register file (or system memory) addresses for the multiplier and multiplicand operands. The resulting outer product can then be stored back into system memory. In the system memory, the outer product is accessible by a memory address and/or a size specified from a register in a register file.

In a alternative embodiments, the vector register file and the general register file may be combined together into a single register file. Further, the specification of the values of B and N may be implicit, as the design may fix these values according to the precision of the multipliers and the size of the register file, or variable as specified by a field in the instruction, or specified by the contents of a register (or a sub-field of the contents of a register) specified by the instruction. Also, the values of B and N may be specified as part of an operand specifier. Additionally, the operand specifier may encode both the address of the result and the size of the result, or alternatively a value from which the values of B and N may be computed or inferred.

In an alternative embodiment, any portion of the multiplier circuit that depends only upon either the multiplier or multiplicand alone can be placed at the periphery of the multiplier array to reduce the number of copies of that portion from $N^2$ to N in the array.

For example, to reduce the number of partial products to be added together, the multiplier may encode the multiplier operand using Booth or other encoding. In such an embodiment, a single Booth encoding circuit of the operand may suffice, as the Booth-encoded value may be presented to the transmission wires and/or circuit to reach the multiplier, thus reducing the number of copies of the Booth encoding circuit from $N^2$ to N in the array.

While radix-4 Booth encoding combines multiples of the multiplicand that can be computed as shifts and complements of the original operand (−2x, −x, 0, x, 2x), some multiplier circuits in an alternative embodiment may require the computation of a small multiple of the multiplicand, as for example radix-8 Booth encoding, which requires computation of a 3x multiple. As each of the N multiplicands in the outer product are transmitted to N multipliers, computation of a small multiple of each multiplicand can be accomplished in a single circuit per multiplicand and the result transmitted to N multipliers, thus reducing the number of copies of the small multiple circuit from $N^2$ to N in the array.

Figure 2:
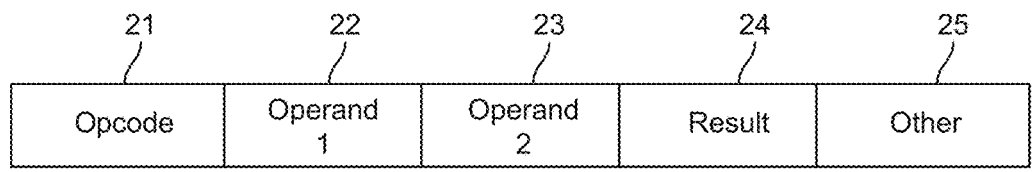
FIG. 2 is a diagram of an outer product instruction.

The format of the outer product instruction in a preferred embodiment is shown in FIG. 2. A first field 21 in the instruction specifies an opcode for the operation to be performed, e.g. OuterProduct, OuterProductAdd, OuterProductExtract, etc., as discussed further below. Field 22 specifies the location of the first vector (e.g. the multiplier) and field 23 specifies the location of the second vector (e.g. the multiplicand). Field 24 specifies a location for storage of the result. Field 25 stores other information that may be needed in conjunction with the other fields, e.g. B, F, H, K, L, M, and N as discussed herein. Note that the instruction fields can be addresses of locations in memory, register identification information, pointers to memory, etc., and the other information above may be specified as part of the instruction, part of the source operands, or part of the result operand.

Further flexibility for implementation of the processor is provided by allowing acceptable values of N for a single instruction to be larger than the value enabled by the multiplier-accumulator array 15 in physical hardware H. In this circumstance, the outer product operation can be performed by successive operation of the physical hardware over H-by-H-sized portions of the multiplier and multiplicand values. In such an embodiment, the extracted or processed result may be expeditiously copied from within the array to the memory system or caches thereof, so that the physical storage of results within the array is limited to a single one, or a small number of, H-by-H-sized portions of the accumulated, the extracted, or the processed results.

In another implementation, the source operands for the outer product multiplication operation are specified as a single instruction specifying an instruction opcode and two register-sized operands. In this case one register from an R-bit register file contains N multipliers, and the other register from the R-bit register file contains N multiplicands, each multiplier or multiplicand using B bits, with the individual values catenated together to fill the register.

Alternatively, the multiplier and multiplicand values can be specified by larger operands to fill the registers, R=N*B. The value of B can be specified as a component of the instruction, by a register or bit field of a register specified by the instruction, or by a bit field of a specifier block specified by a portion of an operand. In other embodiments of the invention, the instruction contains a bit-field that specifies the format of the multiplier and multiplicand operands, for example, as signed integers, unsigned integers, or floating-point values. Alternatively, the formats can be specified by a bit-field, by bit values in a register, or by reference to a location in memory.

For the arrangement of multipliers shown in FIG. 1, where multiplier mm[i][j] 19 receives multiplicand x[i] and multiplier y[j], producing the outer product p[i][j], an example of code to implement the operation is:

For each i:=[0 ... N−1], j:=[0 ... N−1]
p[i][j]:=x[i]*y[j];

It should be understood that in the above notation, the preferred embodiment has sufficient resources to perform all the indicated multiplications at one time; the computation for all the values of i and j and the values dependent upon i and j are performed independently and in parallel. Alternatively, the parallelism may reflect the physical hardware array size, as described by the H-by-H array above.

As mentioned above, the multiplication result is typically too large for the register file. By storing the outer product result into memory, the product is retained as memory-mapped state. Thus, were the processor's normal operation be altered by an interrupt or context switch, the outer product is retained without need for further instructions to copy the value.

In applications such as image processing, it is desirable to compute sums of outer product values. After starting a first OuterProduct instruction, a second instruction can be started using distinct multiplier and/or multiplicand values, then adding that result to the previous outer product result, producing a sum of outer product values. We refer to this instruction as 'OuterProductAdd'. This instruction is similar to OuterProduct, specifying inputs in the same way, and specifying that the result be used as an input value for the addition operation. Thus this instruction computes the sum of two outer product values. Further use of the OuterProductAdd can sum an arbitrary number of outer product values together, herein designated D for depth of summation. Because the sum of two values may be larger than the values individually, and the sums of D outer product values may be larger than the 2B bits required for each product, or the $2B*N^2$ bits overall, an additional $\log_2 D$ bits may be required for each sum of products, or $\log_2 D*N^2$ bits overall. To avoid overflowing the outer product result, such values may be extended by an amount, E bits, which also may be specified by the OuterProduct and OuterProductAdd instruction, either implicitly, for example, to double the size of each result making the result size $4B*N^2$, or by some other amount fixed by the implementation, explicitly in subfield 25 of the instruction, or in an operand of the instruction, or a subfield of one of the operands. Alternatively, the outer product results may be limited in range to handle the possibility of overflow when $E<\log_2 D$.

An example of code for implementing the OuterProductAdd operation in which the result of each multiplication is added to the previous sum of outer products a[i][j], producing a new value for a[i][j] is:

For each i:=[0 . . . N−1], j:=[0 . . . N−1]
p[i][j]:=x[i] *y[j];
a[i][j]:=a[i][j] p[i][j];

Because these sums are formed of successive outer products, the sums can be computed without need for wiring for interconnections among the geographically separate multipliers.

Between uses of the OuterProductAdd operation to compute running sums, the accumulators a[i][j] may be cleared with operation that performs a[i][j]:=0, or alternatively an OuterProduct operation that performs a[i][j]=x[i] *[j] as the result.

Figure 3:
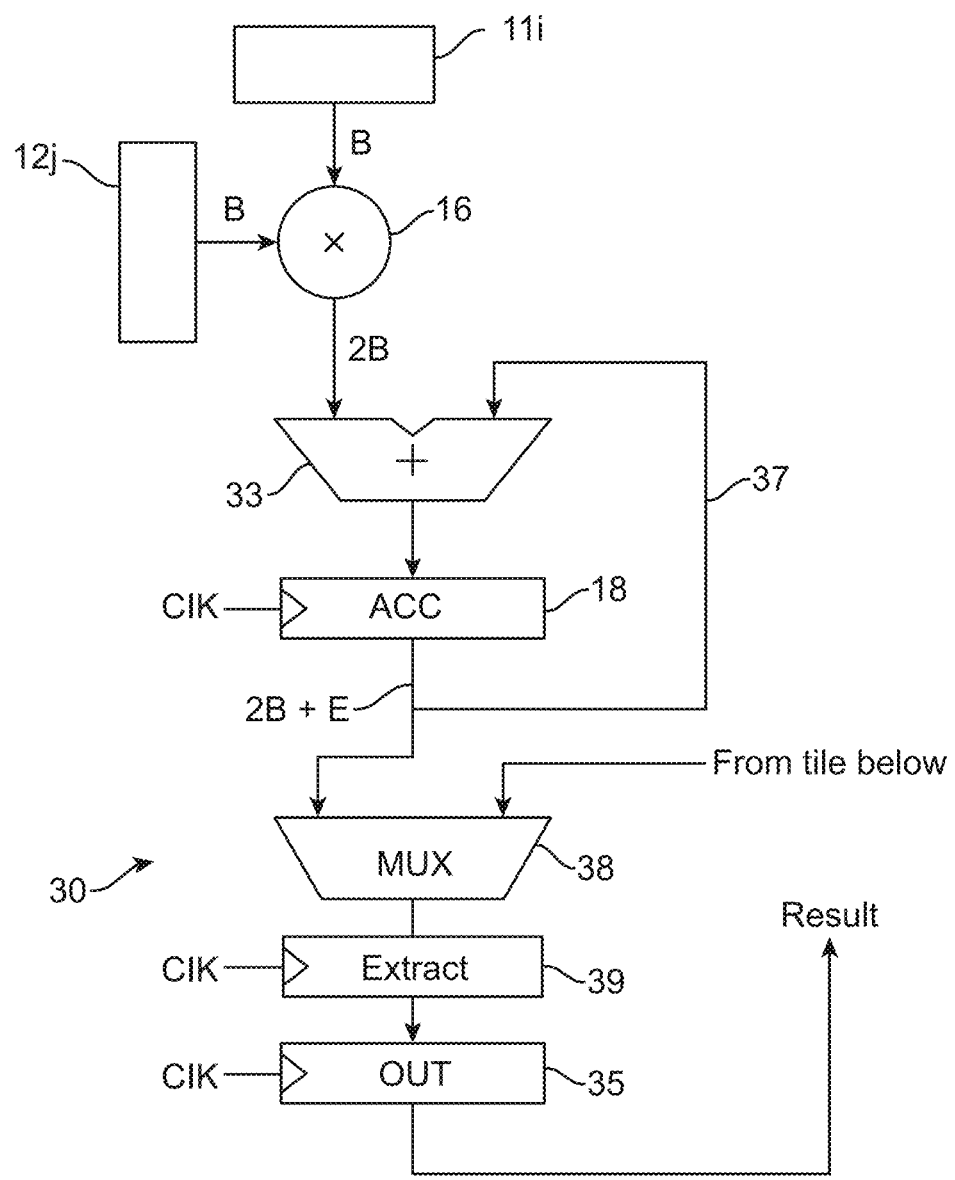
FIG. 3 illustrates in more detail one stage of the multiplier-accumulators in FIG. 1.

FIG. 3 illustrates in more detail one tile 30 of the array shown in FIG. 1. The multiplier operand and multiplicand operand, each B bits in length, stored in registers 11*i* and 12*j*, are provided over buses to the multiplier 16. Multiplier 16 multiplies the received operands and the 2B bit length product is provided to accumulator 18. If an OuterProductAdd instruction is being performed, adder 33 adds the result of the multiplication to the existing sum stored in accumulator 18 and received over bus 37 to adder 33. The multiplication and addition produces a result having 2B+E bits. Once all operations are complete, the final result 'Result' is provided to output register 35 where it is transferred out to the buses interconnecting the array. (Multiplexer 38 is used for loading and unloading data from the array of tiles. This operation is described further below.)

OuterProduct or OuterProductAdd operations such as illustrated in FIGS. 1, 2 and 3 may be interleaved with differing addresses for the result, allowing computation of multiple sums of outer products or other functions to be computed in overlapped fashion. In such an embodiment, each of the specified result locations may be mapped to one or more (K) distinct accumulator storage locations a[i][j][k] in the multiplier array, where k is a value in the range 0 . . . K−1, thus allowing these operations to proceed in interleaved fashion without copying the accumulator values out to and in from the memory system of the processor. Similarly, keeping track of multiple operands for the sums of outer products permits K or fewer multiple simultaneous or interleaved threads of execution in the processor for accessing the outer product multipliers and accumulators without needing the copy the contents of the accumulator state.

The K addresses of operands can be tracked, and when an OuterProduct instruction (as distinct from an OuterProductAdd) instruction is performed to an operand address not previously tracked, one of the K accumulator locations is allocated for this operand address, for example, one that has not been previously used, or one least recently used. Further, when an OuterProductAdd instruction is performed on an operand that is not present in the accumulator, one set of accumulators of the K can be allocated. In other alternative embodiments, the choice of accumulator, i.e. the value of K, may be specified by the instruction in subfield 25 of the instruction, a subfield in a register, in memory, or otherwise. In another embodiment of the invention, an instruction can specify at least two associated opcodes, one specifying that an outer product is produced, and a second specifying that the outer product is added to a previous result, forming an accumulation of sum-of-outer products. In another embodiment of the invention, the accumulator may be cleared by a separate OuterProductClear instruction or instruction that combines this operation with other operations (such as OuterProductExtract detailed below), so that repeated use of the OuterProductAdd instruction alone computes the accumulation of sum-of-outer products.

The additional precision of the accumulated sums of outer products is necessary to compute an accurate sum without concern for overflow or premature rounding. Once the sums of outer products have been computed, however, many algorithms using those results only require a portion of the result, rounded or truncated to a lower precision. In such circumstances, an additional instruction, OuterProductExtract may be performed to extract the needed portion of the result, or produce the result in a lower precision than the originally accumulated sum. Such operations may be implemented using an optional additional circuit 39 as shown in FIG. 3. Such circuitry, labeled "Extract" just as an example in FIG. 3, enables the tile to perform additional processing, e.g. extraction of a portion of the results from the accumulator 18, rounding of those results, or other processing as described below. Note that by placing the other circuitry after the multiplexer it can also further process results from a nearby tile provided via switching circuit 38. If it is desired to only process results from the individual tile in which it is situated, then such other circuitry 39 can be placed between the accumulator 18 and the switching circuit 38. Also, this other circuitry can be placed along the edges of the array rather than at each tile in the array. By placing circuitry 39 at the edge of the array, data from the accumulators can be rounded, extracted, or otherwise processed as it is shifted out of the array. This enables the use of fewer copies of circuitry 39 and reduces circuit complexity within the array.

The selection of the particular portion of the result or the method used to extract typically will be specified as a field, e.g. field 25, in the OuterProductExtract instruction. The operation invoked by the OuterProductExtract instruction may also include a unary operation, for example, an arctangent or hyperbolic tangent function, or it may map negative values to a zero value (as in a ReLU—Rectified Linear Unit function) or other fixed value, and/or convert the result to a lower precision floating-point value.

The OuterProductExtract instruction is normally performed after computing the sums of outer products, e.g. using the OuterProductAdd instruction. In one embodiment, the OuterProductExtract instruction is performed on each value in the accumulators in the array and places the result in the same location as the input, thus overwriting it. In an alternative embodiment, the OuterProductExtract instruction specifies distinct locations for the input and output of the operation, with the size of the result being smaller than the accumulated sums of outer products. In another implementation, the necessary state for the sums of outer products may be divided into two portions, one large enough to contain the final extracted results, and the other making up the remainder of the necessary size. The OuterProductExtract, OuterProduct, and OuterProductAdd instructions can then specify both portions of the operand to access the sums of outer products, with the result being an operand that contains the final extracted results. If the final extracted results are F bits per operand ($F*N^2$ results overall), the additional portion will be at least $(2B+E-F)*N^2$ bits. In an alternative embodiment, the additional portion is released from memory allocation upon execution of the OuterProductExtract instruction, eliminating needlessly copying it to the memory system. As mentioned above, the OuterProductExtract operation may in an alternative embodiment, clear the accumulator value upon extraction, so that subsequent OuterProductAdd instructions can be used to compute a subsequent sum of outer products.

In further embodiments of the invention, successive values of multiplier operands are catenated together into a larger operand, and similarly, successive values of multiplicand operands are catenated together into another larger operand. These catenated operands typically will be stored in the memory system. When so arranged, a single instruction may specify the operand multiplier, operand multiplicand, and outer product result, as well as other parameters as needed, e.g. B, N, F, etc. As discussed above, the instruction may also perform an extraction or further processing of the sum of outer products, specifying the result to be the extracted or processed sum of outer products. The extracted or processed sum of outer products may be smaller than the accumulated sums of outer products. When so specified, the single instruction may operate over multiple clock cycles to perform the entire operation. Alternatively, this operation may be carried out in parallel with other operations or instructions of the processor, and may be synchronized with an operation that utilizes or copies the wide operand result of this operation.

In some applications it is desirable for the outer product to be added to a previously accumulated sum-of-outer product results by one instruction, with a separate instruction clearing the sum-of-outer product results, or alternatively setting them to a fixed value. The result of a single multiplication of a B bit multiplier and a B-bit multiplicand in fixed-point arithmetic requires 2B bits to represent, and there are $N^2$ values in the outer product. Because the outer product result therefore requires $2B*N^2$ bits, these instructions cannot immediately return a result to a register in the register file, nor to a series of registers in the register file. To overcome this limitation, the results can be maintained between instructions as an additional program state, for example, by being stored in memory as specified by the instructions. Later the results can be copied to and from dedicated storage locations near the outer product computation and accumulation circuits.

If the multiplier and multiplicand values exceed the size of the R-bit general-purpose registers, the contents of registers can be catenated together. Then a series of outer product multiplications can be performed, each using one of the series of R-bit multiplicand values and one of the series of R-bit multiplier values. Extracting, limiting, rounding, truncating, normalization, etc. as specified by the instruction can then reduce the size of the results. Thus a single instruction may specify the multiplicand and multiplier operands within memory and return the processed sum-of-outer product result.

In alternative embodiments the outer product instruction may specify these operands individually in bit-fields of the instruction, or may specify other operands that incorporate these operands, as well as other information, such as the size and format of the operands. Alternatively, contiguous or non-contiguous portions of the multiplier and/or multiplicand values may select the successive multiplier and/or multiplicand values. For example, a selection of fields of the multiplier may perform a convolution operation in sequential outer product multiplications.

For several of the operations above, operands may be presented to the array in interleaved form, that is, the N-element vector presented as multiplier or multiplicand may be formed using single elements from N vector or matrix values. For these operations, there will be an interleaved operand presented to the outer product array. A transpose circuit shown in FIG. 4 can provide this interleaving. In that circuit $N^2$ values are clocked into a storage array with N-way parallelism along one dimension, for example from register 12, and then are read out of the array with N-way parallelism along the orthogonal dimension to register 11, now in interleaved form. The output of this circuit provides N operands in an orthogonal dimension to the input. Thus it can be used with the outer product array, which requires the multiplier and multiplicand to be presented to the array simultaneously in orthogonal dimensions. The data can be transposed before being provided to the array, or the transpose circuit may be embedded within the multiplier array. If embedded within the array the multiplier and multiplicand values can be presented along a single dimension, one of the operands being interleaved or transposed upon entering the combined circuit. Because this interleaving circuit imposes a delay, the operands to be transposed preferably will be entered earlier enabling the multiplier and multiplicand operands to meet simultaneously at the multiplier circuits.

Figure 4:
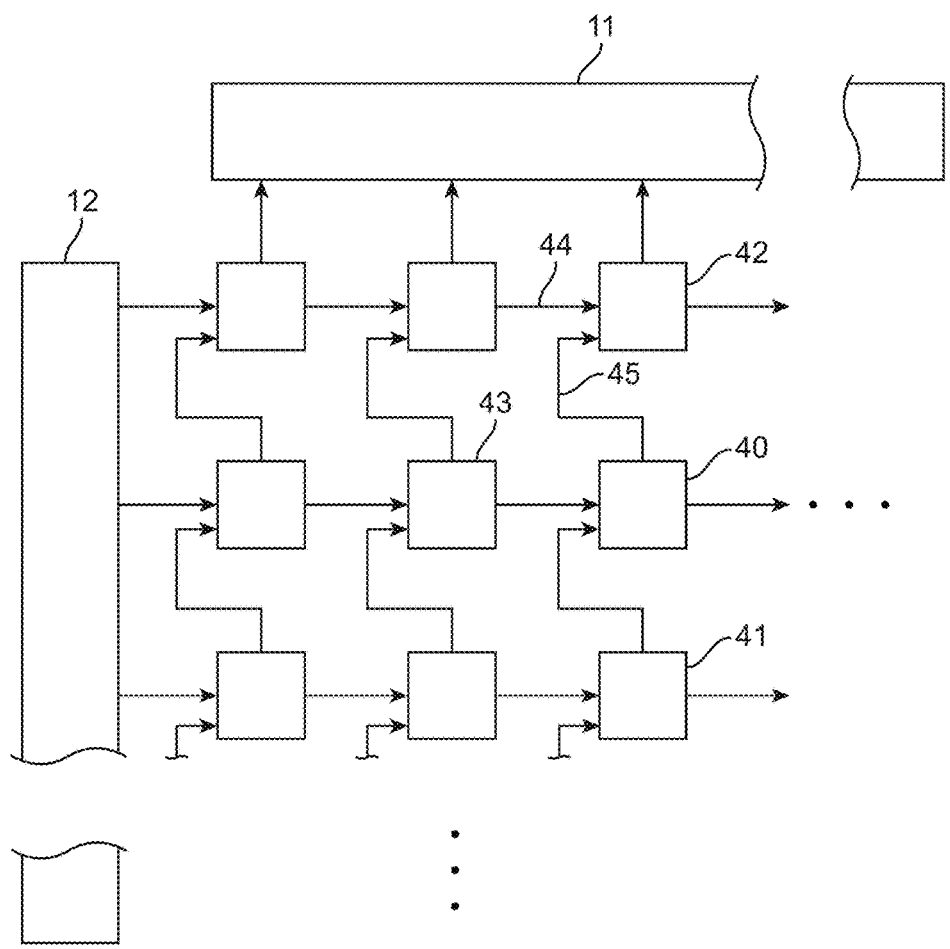
FIG. 4 illustrates transfer of data into and out of the array.

FIG. 4 illustrates a portion of array 15 to illustrate transposing the input data, as well as to transfer out the results of the parallel multiplications and accumulations. In the portion of the array illustrated, an array tile 40 is coupled to the surrounding tiles 41, 42 and 43 by data buses, represented as arrows in the figure. Data to be used in the multiplications ultimately will be loaded into the multiplier in every tile in the array. This can be performed by clocking the data into every row in parallel so that all tiles in all rows are filled with data, or by loading the data sequentially one row at a time. Whichever approach is used, eventually two operands will be loaded into every tile in the array.

To transpose the input data, or to transfer out the results, each tile, e.g. tile 42, in the array preferably includes a multiplexer 38 (see FIG. 3), or more generically a switching circuit 38, to enable selecting between the data on the two input buses to that tile. In the case of tile 42, the multiplexer 38, in response to a control signal, chooses between receiving the data on bus 44 and bus 45. When the tiles in that row are being loaded with data the mux 38 will be used to select data on bus 44. When it is desired to shift the data upward, for example, to transfer results to storage 11, mux 38 will be used to select data on bus 45. As evident, by use of the multiplexers and the vertical buses between the tiles in each vertical column of the array, ultimately all of the data from the computations in the array can be loaded into storage 11. Once the top row (with tile 42) is filled, all data in that row can be clocked out to storage 11, preferably in a parallel operation so data in all tiles in that row is transferred out simultaneously. In an alternative embodiment, additional storage can be provided at the end of each row, e.g. opposite storage 12, to allow shifting of results data out of the array to that opposite side.

Physical Layout Considerations

Typically, as shown in FIG. 1, the layout of the array implemented as an integrated circuit preferably has the multiplier and multiplicand values distributed in orthogonal directions, with the multiplier circuits arranged at or near the crosswise intersection of the individual multiplier value and the individual multiplicand value. The accumulator circuits preferably will be arranged near the corresponding multiplier circuit to minimize interconnection length. The multiplier result may employ carry-save adders and produce a product in a redundant form, and the accumulator may take this product and add it to previous values, also using carry-save adders. This approach allows the entire accumulation to be performed in carry-save arithmetic, avoiding propagation of long carries until production of the entire result. If desired, a carry-propagate adder can be located at the output of the accumulator circuit, and combined with circuits to round the result. For example, by rounding off as by adding a rounding bit to the result at an appropriate bit position, and then truncating the lower-order portion of the result, the result can be communicated using fewer bits. In an alternative embodiment, the lower-order portion of the result is simply truncated without benefit of rounding. Full propagation of carries provides for the result to be communicated using the fewest bits for a binary representation. Depending upon the application, circuitry may also be employed to limit the maximum value of the output to avoid an overflow into an output field. Furthermore, if appropriate for an expected application, circuitry may be included at each accumulator to perform a unary operation, for example, an arctangent function or the rectified linear unit (ReLU) function on each operand of the result with $N^2$ parallelism.

In appropriate applications, rounding or other circuitry is provided at the edge of the array, e.g. incorporated within blocks 11 and 12 in FIG. 1, where N values are read from the $N^2$ array at one time. In this way, only N copies of the rounding or other circuitry are required. If all such circuitry is moved to the edge, the accumulated result, in redundant form, may require $2*(E+2*B)$ bits for each operand to be communicated to the edge of the array, requiring $N*2*(E+B)$ total bits to be communicated, as with separate wires or differential pairs of wires. Depending on the power and area required for such additional wires over the first approach, it may be favorable to use $N^2$ or N copies of any or all of the carry-propagate adders, rounding, limiting and unary function circuitry with the $N^2$ multiplier-accumulator array. In addition the number of wires can be reduced, at pain of requiring more than one cycle to return a set of N operands. For example, if only $N*B$ wires are present to return results, the $N^2$ values may still be communicated, but requiring B cycles per set of N operands, where $E<=B$ and the values are provided from the accumulator in redundant form. In the case of the convolution computation described below, this does not slow the rate of result production as long as $6N<=FX*FY$.

Alternatively, a partial carry-propagation may be performed at the output of the multiplier and/or the output of the accumulator. For example, carries may be propagated within bytes, producing 8+e bits of output per byte, where e is a number of additional bits of carries that result from adding two or more bytes together. Adding a byte of carries (shifted one bit to the left) to a byte of sums (not shifted) may require 2 additional bits to represent the sum. Even so, these 10 bits are less than the 16 bits that a fully redundant result would require. If the number of wires per byte of result is 8+e, for the N values to the communicated to the edge of the array, the number of cycles could then be returned to 3 cycles per set of N operands, or more or less, depending on the number of wires and the degree to which carries are propagated. As we can see from this alternative embodiment, there is no requirement that these intermediate values be carried with an integral number of wires per bit of result, and the number of cycles required to communicate a set of N operands may be any useful figure that makes good utilization of the wires available.

When the multiplier and multiplicand operands are large in comparison to the size of a general register of the processor, e.g., if the operands are 1024 bits in a processor and the general register size is 128 bits, the invention may take into consideration the delay involved in transmitting these operands across the multiplier array. While the diagrams above nominally assume that the multiplier and multiplicand are shifted across the entire array in a single clock cycle, speed-of-light propagation delay and resistive-capacitive (RC) delay may limit the clock speed. Each row of tiles can be considered to consist of an RC network with each tile resistively connected to neighboring tiles, and each tile imposing a capacitive load on the bus connecting the tiles. With large numbers of tiles in a row, the RC loading will be detrimental to those tiles furthest from the location where data is first supplied.

Figure 5:
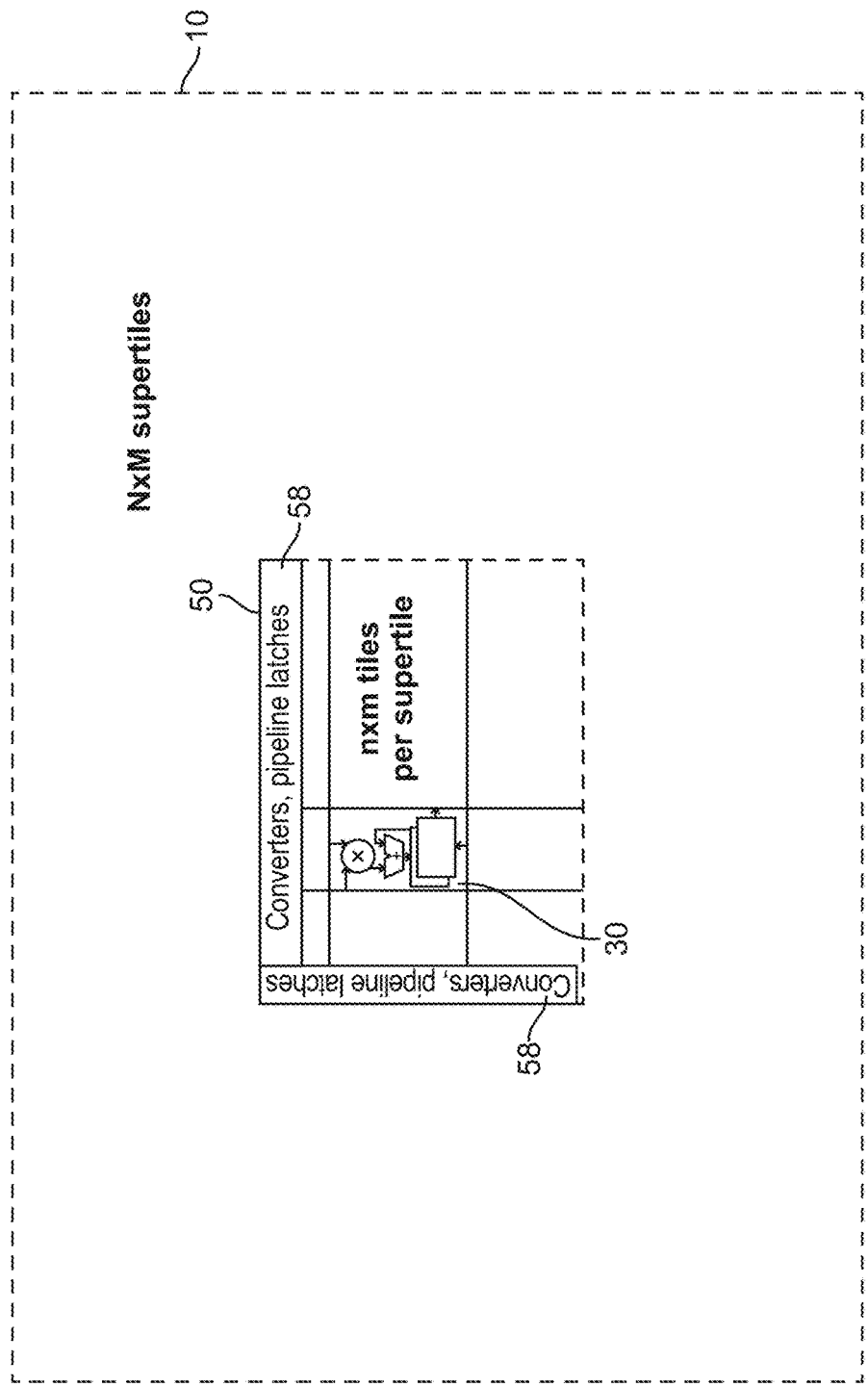
FIG. 5 illustrates a supertile.

One solution to this is to provide for sub-groups of tiles, or for every tile, amplification, latching, or other processing of the signals between groups of tiles. This approach is illustrated in FIG. 5. FIG. 5 illustrates the array 10 divided into a set of N×M "supertiles" 50. Each supertile 50 is divided into a set of n×m tiles 30 such as described above. (Note that in the case of the supertile 50 including only a single tile 30, n×m will be 1.) Associated with each supertile 50 are sets of appropriate latches, converters, amplifiers, signal processors, etc. 58, examples of which are described below. These circuits 58 process the signals on the row and column buses as necessary before providing those signals to the group of tiles 30 within the supertile 50. Such processing can also be provided to the results signals from each supertile, as necessary.

Figure 6A:
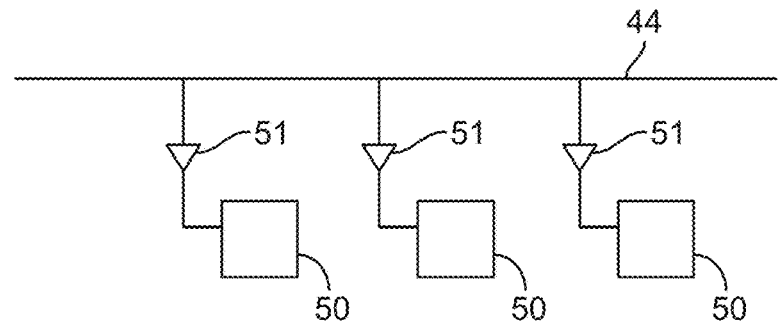
FIGS. 6a to 6c illustrate techniques for overcoming RC delays in the array.
Figure 6B:
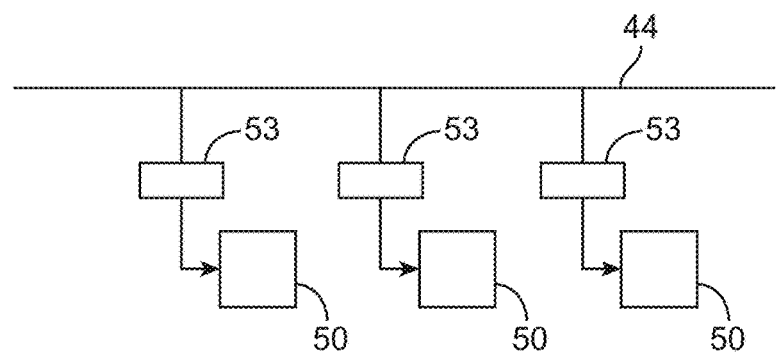
Figure 6C:
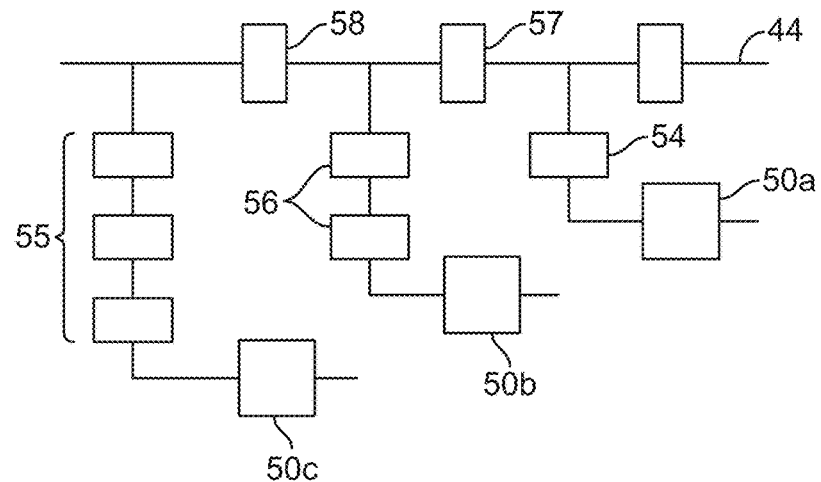

FIGS. 6a, 6b and 6c illustrate typical signal processing that may be included within the circuit 58 illustrated in FIG. 5. In FIG. 6a amplification circuits 51 are provided between the row bus 44 and the supertiles 50. Alternatively, one or more cycles of delay may be removed to allow some multiplier circuits to begin operations sooner than others. When it comes time to read out the result of the accumulators, adding additional pipeline stages in the path from the accumulators to the output can compensate for these cycles. Alternatively, the effective latency of the entire array can be reduced, by reading out portions of the array sooner. If, as described above, sequential circuits are employed to read the array output with order N parallelism, this effectively reduces the latency of the result, as the remainder of the array can be read in a continuous flow following the earlier results.

Another signal processing approach, shown in FIG. 6b, is to provide for each supertile 50 a register 53 to hold the data when it arrives, then in response to later clock signals, transfer that data to the tiles. FIG. 6c illustrates a third approach. There, to correct latency and overcome the RC loads, registers are inserted into the data path to equalize the delay of signals arriving at each supertile. Supertile 50a, for example, is separated from the input side of the array by three registers—registers 54, 57 and 58. Three registers of delay from the input—registers 56 and 58, also separate supertile 50b. Similarly there are three registers 55 of delay between the first supertile 50c in the row and the input.

An alternative approach addressing this issue can be used where it is presumed that in a single clock cycle, only G of the N values can be transmitted in a single cycle. This distance G may be enhanced by the fact that only a single receiver loads the transmission wire in this alternative design. To address this, additional clock delays can be inserted for values that would otherwise arrive before their counterpart. This distribution network delays both the multiplier and multiplicand values by equal amounts in reaching the multiplier circuit. The choice of which of the techniques described above to use will depend on the size of the array, its intended uses, and the extent of RC issues.

Alternative Tiles

Figure 7A:
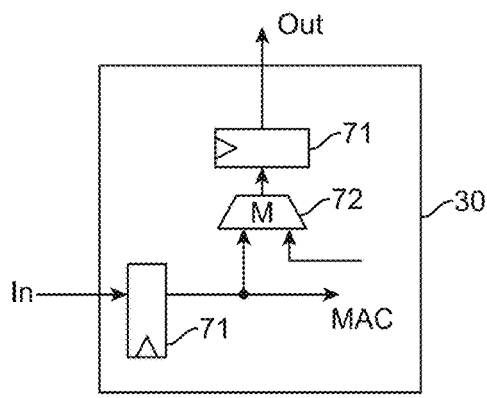
FIGS. 7a to 7d illustrate transpose circuits.
Figure 7B:
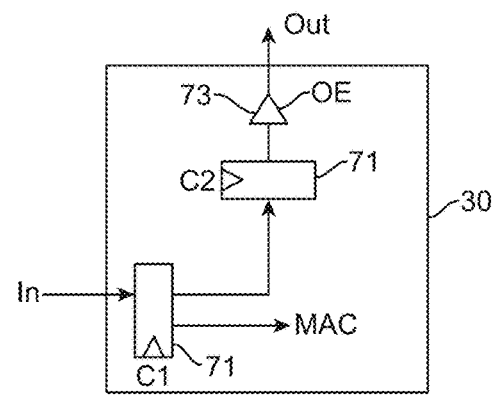
Figure 7C:
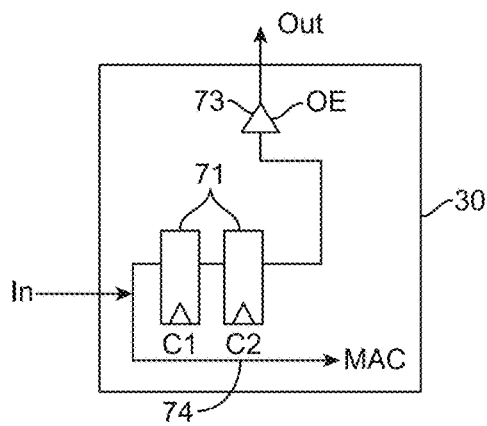
Figure 7D:
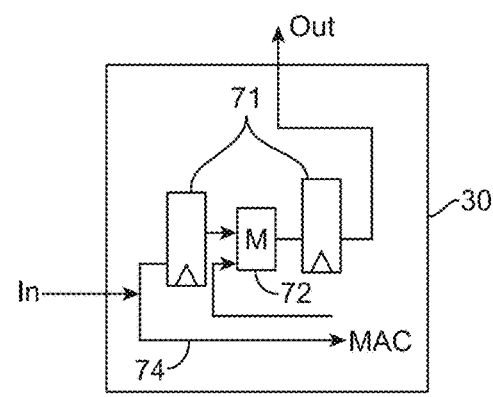

FIGS. 7a to 7d illustrate alternative approaches to providing transpose circuits within the tiles. The multiplier and accumulator (MAC) are not shown in these figures but would correspond to that shown in FIG. 3. In FIG. 7a flip-flops 71 are used to clock the data into and out of the tile 30, with a multiplexer 72 used to select between the input data path and the output from the MAC. In FIG. 7b two flip-flops 71 are again used but with different clock signals C1 and C2, and an output enable circuit 73 controlled by signal OE, used to select the data path. FIG. 7c is similar to FIG. 7b, but with the input data being provided to the next tile with a bypass bus 74. FIG. 7d is similar to FIG. 7a, but also employs a bypass bus 74.

Figure 8A:
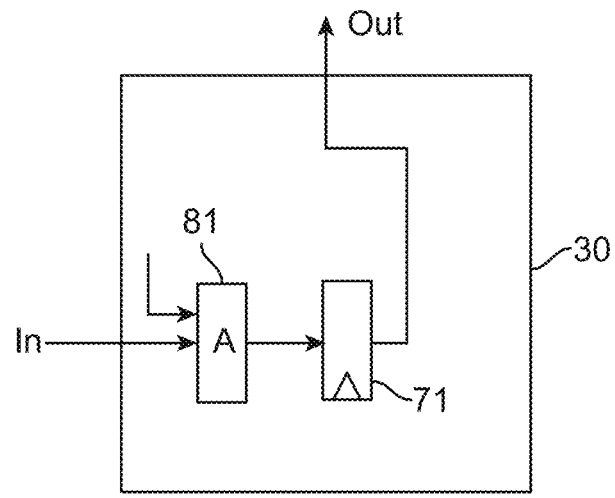
FIGS. 8a and 8b illustrate output circuits.
Figure 8B:
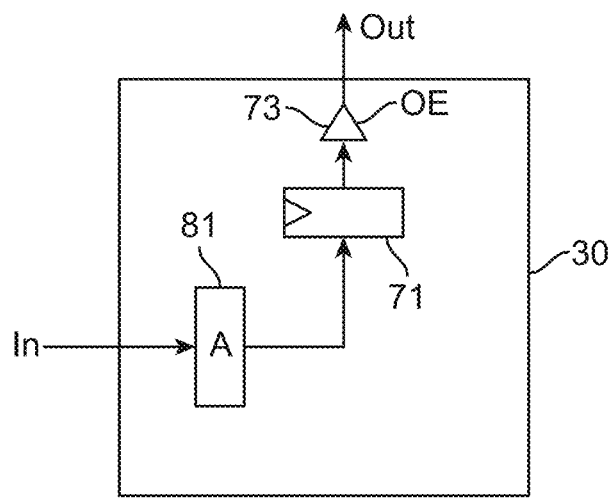

FIGS. 8a and 8b illustrate alternative output circuits for the tiles 30. In FIG. 8a a flip-flop 71 stores the result from the accumulator 81 and provides that to the output. In FIG. 8b an output enable circuit 73 is provided between the flip-flop 71 and the output terminal.

Convolution Operations

The processor described here can also perform convolution operations. The multiplier array 10 shown in FIG. 1 can perform N convolutions between an D-dimensional array representing an input value and N D-dimensional arrays representing a filter value, producing N D-dimensional arrays representing the convolution of the input value with the filter value. Alternatively, N convolutions between N D-dimensional arrays representing input values may be convolved with a D-dimensional array representing a filter value, producing N D-dimensional arrays representing the convolution of the input values with the filter value. An example of these operations is discussed below with respect to FIG. 9. The symmetry of the convolution operation further permits an exchange of the input value and the filter value with only some notational differences. If D is 2, these operations correspond to 2-dimensional values that may represent images. For purposes of this description, the dimensions of the N filter values are represented by FX-by-FY, and the dimensions of the input value are IX-by-IY. The dimensions of the result, R if the complete set of convolutions are computed without extending or limiting values in the input array, will be a 2-dimensional array described as RX-by-RY, where RX=IX−FX and RY=IY−FY. We can see that FX*FY-long sums are required, and the total amount of multiplies is RX*RY*FX*FY*N, which shall be computed with $N^2$ multiplications in parallel, consequently performing the convolution in RX*RY*FX*FY/N cycles, plus some additional cycles to copy the result from the accumulators.

An example of code to implement this operation is:

For each k:=[0 . . . RX−1], l:=[0 . . . RY−1], m:=i:=[0 . . . FX−1], j:=[0 . . . FY−1]
R[k,l,m]:=R[k,l,m]:=sum[I[k+i,l+j]*F[i,j,m]]

The inner loop of operation (a singular input value and N filter values) presents a single one-dimensional vector as the multiplier selected from a variably shifted subject of the input value, and a set of N values at the multiplicand operand, selected from the N filter values. By iterating over each of the filter values in sequential cycles, $N^2$ sums representing a portion of the entire convolution are computed, using FX*FY cycles. Specifically, on a single pass computing $N^2$ sums comprising R[k, l, m] where k ranges from k k+N−1, (assuming that N<=RX), 1 is a particular value in the range [0 . . . RY−1], and m ranges from 0 . . . N−1: N values from the I array are selected on each cycle and presented to the sum-of-outer product array as the multiplier X. Assuming that N<IX, these may be consecutive values with a common value of l+j in the y-coordinate, and values of k+i . . . k+i+N−1 in the x-coordinate, to match up with a filter values F[i, j, m] of a particular value of i, and j, with m ranging from [0 . . . N−1], these filter values presented to the sum-of-outer product array as the multiplicand Y.

An example of code to implement this operation is:

For each k:=[0 . . . RX−1, by N], l:=[0 . . . RY−1]
For each i:=[0 . . . FX−1], j:=[0 . . . FY−1]
    X[n]:=I[k+i+n,l+j], n:=[0 . . . N−1]
    Y[m]:=F[I,j,m] m:=[0 . . . N−1]
    a[n,m]:=a[n,m]+X[n]*y[m], n: =[0 . . . N−1], m:=[0 . . . N−1]
R[k+n,l,m]:=Extract[a[n,m]], n:=[0 . . . N−1], m:=[0 . . . N−1]

Because the complete sums representing the convolution are computed in the accumulators, they can be copied out of the array using a combination of parallel and sequential transfers. For example, if a data path of width B*N is available, on each cycle B bits from N accumulators can be copied out of the array. As we have described earlier, the entire sums, comprising E+2B bits, or a subfield, computed after extracting (e.g. by rounding, limiting and/or shifting) of the accumulated sums may be the results copied out of the array. When copying the entire values, if E<B, 3 cycles would suffice to copy N values from the array, and 3N cycles for the entire set of $N^2$ sums comprising the entire array. The circuitry for copying the result out of the array may operate concurrently with the computation of a successive set of sums of outer products, and would not require additional cycles so long as 3N<=FX*FY. In alternative embodiments, if an extracted result that only required 1 cycle to copy N values from the array, no additional cycles would be needed so long as N<=FX*FY.

As we have shown that the convolution operations are performed with $N^2$ multiplications in parallel for N D-dimensional filter arrays in parallel, it should be apparent that this mechanism can be extended for more than N filter arrays, simply by selecting N filter arrays for a first computation, and another N filter array for a second computation and so on. Thus this technique can be extended for a larger number of filter arrays than N. Similarly, this technique can be extended for arrays of dimensions other than 2, such as for 1-dimensional array, by removing iterations over 1 and j, or for 3-or-more dimensions, by further sequentially iterating over the third or more dimensions in R and F.

Minor alterations to the code can utilize the full array even if RX<N. Because the computation of the R[k, l, m] values are independent, it only requires that the X-operand selection choose an appropriate modification of the k+i+n and l+j subscripts for values of n, where k+i+n>IX, and that the R-value output modify the k+n and l subscripts for values of k+n>RX.

Figure 9:
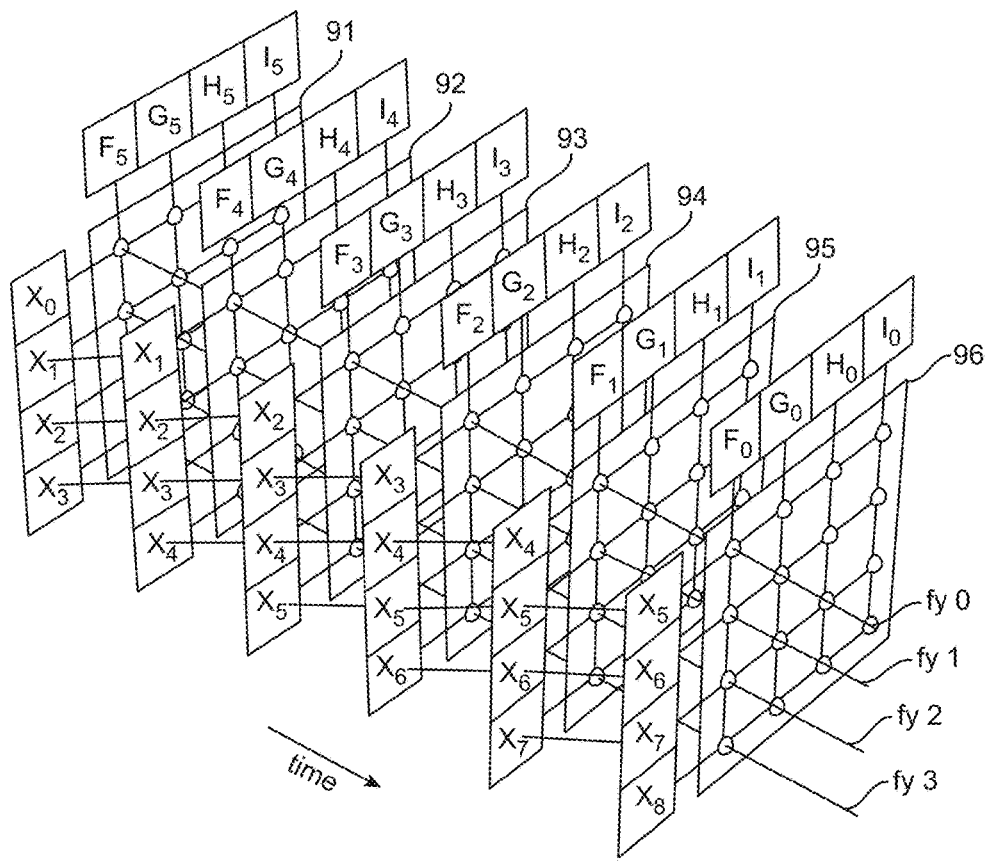
FIG. 9 illustrates a convolution operation using the array.

FIG. 9 illustrates one example of a convolution operation in which four distinct 6-point filters F, G, H and I, are run across a 1-dimensional time series. For illustration only a 4×4 outer product array is shown, but the array can be as large as desired. The vertical planes 91, 92, 93, 94, 95, and 96 represent successive cycles of the outer product array. The intersection points of the operands (small spheres in the figure) each represent a multiply-accumulate operation. Thus, during a first operation filter value F5 and input value x0 are multiplied together. During subsequent operations filter value F4 and value x1 are multiplied together, then filter value F3 and input value x2 are multiplied together, etc. The lines fy0, fy1, fy2, and fy3 extending through the planes 61, 62 . . . 66 represent the summations for filter F.

Other columns of summations are performed in parallel, that is, the next column of summations gy0, gy1, gy2, and gy3 for the G filter are performed at the same time. These summations for the G, H and I filters are not labeled to keep the figure from becoming unreadable. After initial loading of the starting 4 values, only a single new input per cycle is needed along the X input column. Depending on the presence of any edge processors, an optional shift register along that dimension may be added. Furthermore, if desired, the internal multipliers can use any adjacent-element shift fabric to send the values up. Doing it this way requires only a single element by having a broadcast along the bottom.

Matrix Multiplication Operations

The multiplier array can perform $N^2$ multiplications as portions of a Matrix-to-Matrix multiplication, with two input operands that are each at least two-dimensional arrays and at least one dimension of the two operands match one-for-one. This operation multiplies a first operand, a D1-dimensional array with a second operand, a D2-dimensional array, with DC dimensions in common. The result will be an array with DR-dimensions, such that DR=D1+D2-DC. For such an operation, the utilization of the array will be 100% if the product of dimensions of the first operand not in common (D1-DC) are at least N, and the dimensions of the second operand not in common (D2-DC) are at least N. Such an operation proceeds by presenting, for each N-by-N subset of the result, all of the corresponding N values of the first and second operands, over a number of cycles equal to the size of all the DC-dimensions in common, producing $N^2$ sums of products. For illustrative purposes, we show an example of a first 2-dimensional array of dimensions IX-by-IY multiplied by a second 2-dimensional array of dimensions FX-by-FY, where a single common dimension, denoted by IY and FX is combined to form the outer product, a 2-dimensional array R described as RX-by RY, where RX=IX and RY=FY.

An example of code to implement this operation is:
For each k:=[0 . . . RX-1, by N], l:=[0 . . . RY-1, by N]
  For each i:=[0 . . . IY-1]
    X[n]:=I[k+n,i], n:=[0 . . . N-1]
    Y[m]:=F[i,l+m] m:=[0 . . . N-1]
    a[n,m]:=a[n,m]+X[n]*y[m], n: =[0 . . . N-1], m:= [0 . . . N-1]
  R[k+n,l+m]:=Extract[a[n,m]], n: =[0 . . . N-1], m:= [0 . . . N-1]

The inner loop of the operation presents a single one-dimensional vector as the multiplier, selected from the first input matrix I, and a set of N values as the multiplicand, selected from the second input matrix F. By iterating over the common dimension (or dimensions in the general case) in selecting the vector subsets, $N^2$ sums of products are computed, representing a portion of the output matrix R, using IY cycles.

Figure 10:
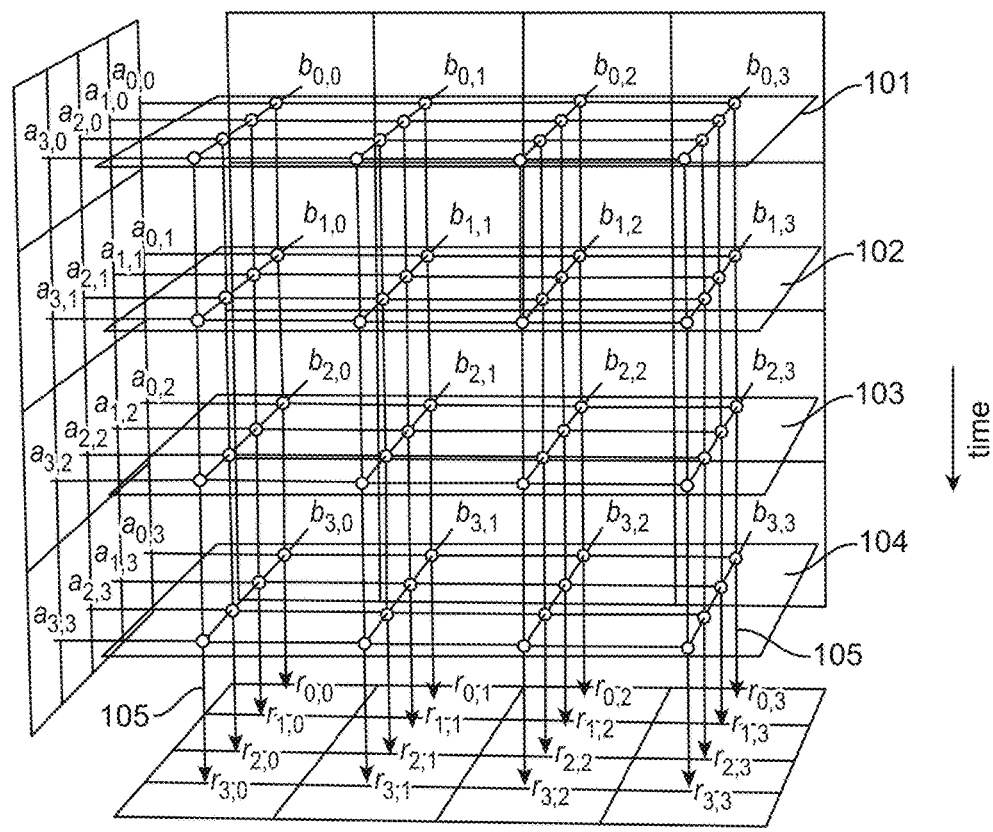
FIG. 10 illustrates a matrix multiply operation using the array.
Figure 11:
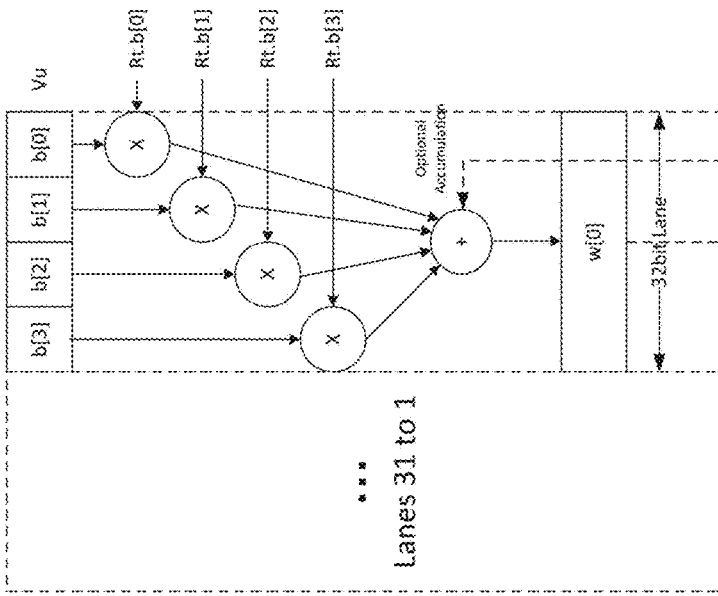
FIG. 11 illustrates a prior art vector SIMD multiply operation.

FIG. 10 is a diagram illustrating an example of use of the array for matrix multiplication. In the example, for simplicity two 4×4 matrices are multiplied together, but the size of the arrays can be as large as desired. Each vertical plane 101, 102, 103, and 104 represents one use of the multiplier array. The four such stacked planes 101, 102, 103, and 104 are four successive uses of the unit, one after another in time. The input multiplicand operands a[i][j] ranging from a[0][3] to a[3][3] are shown along the left side of the figure, while the multiplier operands b[i][j] ranging from b[0][0] to b[3][3] are shown at the back of the figure. These input operands are matrices, and the figure illustrates a 4×4 matrix-multiply using 4 cycles of a 4×4 multiplier array.

Each intersection of the a[i][j] operand and the b[i][j] operand represents one multiply-accumulate operation at that location. The vertical lines 105 represent the summation direction with the results r[i][j] ranging from r[0][0] to r[3][3] shown in the lower portion of FIG. 7.

Notice that in FIG. 10, time flows in the summation, and thus only single rows of input are required. There is storage in the array, but this can be provided in the form of latches that carry the accumulator result from one cycle to the next. In neural net processing involving very long sums-of-products, it is advantageous to feed the larger operand in row-by-row, and let the smaller number of accumulations requiring memory occur over time.

This description of the invention has been presented for illustration and description. It is not intended to be exhaustive or to limit the invention to the precise form described, and many modifications and variations are possible in light of the teaching above. The embodiments were chosen and described to explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A processor for multiplying each one of a plurality n of multiplier operands each having a bit width of b bits and having an aggregate width of r bits where r=n*b with every one of a plurality n of multiplicand operands each having a bit width of b bits and having an aggregate width of r bits where r=n*b, the processor comprising:

a register file having a bit width of r bits;
an array of multiplier circuits arranged in rows and columns, each column coupled to receive one multiplier operand, each row coupled to receive one multiplicand operand, whereby each multiplier circuit receives a multiplier operand and a multiplicand operand and multiplies them together to provide a plurality $n^2$ of multiplication results having an aggregate bit width greater than r bits;
an array of adder circuits arranged in rows and columns, each adder circuit being coupled to a corresponding multiplier circuit;
an array of accumulator circuits arranged in rows and columns, each accumulator circuit being coupled to a corresponding adder circuit; and
wherein the multiplication result from each multiplier circuit is added to any previous multiplication result stored in the accumulator circuit and provided to the corresponding accumulator circuit and to thereby provide an accumulation result.

2. A processor as in claim 1 in which a single instruction causes the processor to perform multiplications of the operands and accumulations of the multiplications.

3. A processor as in claim 1 wherein the accumulator circuit retains values in a redundant form.

4. A processor as in claim 1 further including an array of output stage circuits, each output stage circuit being coupled to the corresponding accumulator circuit for storing the accumulation results before transfer of the accumulation results from the processor.

5. A processor as in claim 4 further comprising an array of switching circuits coupled between each accumulator circuit and its corresponding output stage circuit for controlling data provided to the output stage circuit.

6. A processor as in claim 5 wherein the switching circuits enable data from another accumulator circuit in the array to be provided to the output stage circuit.

7. A processor as in claim 4 further comprising an array of additional data processing circuits arranged in rows and columns, the additional data processing circuits coupled between each accumulator circuit and a corresponding output stage circuit, the additional data processing circuits for performing further operations on data in the accumulator circuits.

8. A processor as in claim 7 wherein the additional data processing circuits provide at least one of extraction of a portion of the data in the accumulator circuits, rounding of the data in the accumulator circuits, or application of a function of the data in the accumulator circuits.

9. A processor as in claim 4 further comprising at least one data processing circuit coupled to the array to provide at least one of extraction of a portion of the data in the accumulator circuits, rounding of the data in the accumulator circuits, or application of a function of the data in the accumulator circuits as that data from the accumulator circuits is transferred out of the array.

10. A processor as in claim 9 wherein the at least one data processing circuit comprises a plurality of data processing circuits, each data processing circuit coupled to subset of less than all of the accumulator circuits in the array.

11. In a processor for multiplying each one of a plurality n of multiplier operands each having a bit width of b bits and having an aggregate width of r bits where r=n*b with every one of a plurality n of multiplicand operands each having a bit width of b bits and having an aggregate width of r bits where r=n*b, the processor comprising:
a plurality $n^2$ of tiles, each tile including:
a multiplier circuit coupled to receive one of a plurality n of multiplier operands and one of a plurality n of multiplicand operands and multiply them together to provide a multiplication result having a bit width greater than r bits;
an adder circuit coupled to the multiplier circuit; and
an accumulator circuit coupled to the adder circuit;
wherein the multiplication result from the multiplier circuit is provided to the adder circuit and added to any previous multiplication result stored in the accumulator circuit to thereby provide an accumulation result.

12. A tile as in claim 11 further comprising an output stage circuit coupled to the accumulator circuit for storing the accumulation result.

13. A tile as in claim 12 further comprising a switching circuit coupled between the accumulator circuit and the output stage circuit for selecting data to be provided to the output stage circuit.

14. A tile as in claim 13 wherein the switching circuit enables data from another tile to be provided to the output stage circuit.

15. In a processor having an array of multiplier circuits arranged in rows and columns, an array of accumulator circuits arranged in rows and columns, and an array of adder circuits arranged in rows and columns, each multiplier circuit having an associated adder circuit and an associated accumulator circuit, the processor having a register file with a bit width of r bits, a method of performing an outer product of a vector multiplier operand and a vector multiplicand operand comprising:
loading a first multiplier operand and a first multiplicand operand into each of the multiplier circuits, the multiplier circuit at location [i, j] in the array receiving first multiplier operand i and first multiplicand operand j;
at each multiplier circuit performing a multiplication of the first multiplier operand i and the first multiplicand operand j to produce a first multiplication result i*j which is wider than r bits; and
providing the first multiplication result to the associated adder circuit; adding the first multiplication result to any previous multiplication result to provide an accumulated multiplication result to the associated accumulator circuit.

16. A method as in claim 15 further comprising:
loading a second multiplier operand and a second multiplicand operand into each of the multiplier circuits, the multiplier circuit at location [i, j] in the array receiving second multiplier operand i and second multiplicand operand j;
at each multiplier circuit performing a multiplication of the second multiplier operand i and the second multiplicand operand j to produce a second multiplication result which is wider than r bits;
at each multiplier circuit providing the second multiplication result to the associated adder circuit; at each multiplier circuit providing the first multiplication result from the associated accumulator circuit to the associated adder circuit;
adding the second multiplication result to the first multiplication result to provide a new accumulation result; and
storing the new accumulation result in the associated accumulator circuit.

17. A method as in claim 16 wherein a single instruction causes the processor to perform multiplications of the operands and accumulations of the multiplications.

18. A method as in claim 16 wherein the processor further includes an array of output stage circuits, each output stage circuit being coupled to an associated accumulator circuit, and the method further comprises storing the new accumulation result in the output stage circuit.

19. A method as in claim 16 further comprising an array of switching circuits coupled between each accumulator circuit and its associated output stage circuit for controlling data provided to the output stage circuit.

20. A method as in claim 19 wherein the switching circuits enable data from another accumulator circuit in the array to be provided to the output stage circuit associated with a different accumulator circuit.

21. A method as in claim 18 further comprising a step of at least one of: (i) extraction of a portion of data in the accumulator circuits, (ii) rounding of data in the accumulator circuits, or (iii) application of a function to data in the accumulator circuits.

22. A method as in claim 18 further comprising an array of additional data processing circuits arranged in rows and columns, the additional data processing circuits coupled between each accumulator circuit and each output stage circuit, the additional data processing circuits for performing further operations on data in the accumulator circuits.

23. A method as in claim 22 wherein the additional data processing circuits perform at least one of extraction of a portion of data in the accumulator circuits, rounding of data in the accumulator circuits, or application of a function to data in the accumulator circuits.

* * * * *